United States Patent
Chao et al.

(10) Patent No.: US 9,692,509 B2
(45) Date of Patent: Jun. 27, 2017

(54) LIGHT EMITTING DEVICE AND DRIVING METHOD THEREOF

(71) Applicant: Industrial Technology Research Institute, Hsinchu (TW)

(72) Inventors: Chia-Hsin Chao, Hsinchu County (TW); Yen-Hsiang Fang, New Taipei (TW); Ming-Hsien Wu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/975,864

(22) Filed: Dec. 21, 2015

(65) Prior Publication Data
US 2017/0149498 A1    May 25, 2017

(30) Foreign Application Priority Data

Nov. 23, 2015   (TW) .............................. 104138846 A

(51) Int. Cl.
*H04B 10/116* (2013.01)
*H05B 33/08* (2006.01)

(52) U.S. Cl.
CPC ....... *H04B 10/116* (2013.01); *H05B 33/0845* (2013.01)

(58) Field of Classification Search
CPC .......................... H04B 10/116; H05B 33/0845
USPC .......................................................... 398/172
See application file for complete search history.

(56) References Cited

U.S. PATENT DOCUMENTS

| 6,410,942 B1 | 6/2002 | Thibeault et al. |
| 2013/0236183 A1 | 9/2013 | Chao et al. |

FOREIGN PATENT DOCUMENTS

| CN | 102222452 | 10/2011 |
| CN | 102325398 | 1/2012 |
| CN | 102497690 | 6/2012 |
| CN | 103873174 | 6/2014 |
| CN | 104022822 | 9/2014 |
| TW | 200838354 | 9/2008 |
| TW | 201338444 | 9/2013 |

OTHER PUBLICATIONS

McKendry et al., "Visible-Light Communications Using a CMOS-Controlled Micro-Light-Emitting-Diode Array," Journal of Lightwave Technology, Jan. 1, 2012, pp. 61-67.
Kelly et al., "High-speed GaN micro-LED arrays for data communications," 14th International Conference on Transparent Optical Networks (ICTON), Jul. 2-5, 2012, pp. 1-5.
"Office Action of Taiwan Counterpart Application", issued on Aug. 9, 2016, p. 1-p. 8.

*Primary Examiner* — Leslie Pascal
(74) *Attorney, Agent, or Firm* — Jianq Chyun IP Office

(57) ABSTRACT

A driving method of a light emitting device including visible light emitting elements is provided. In a first visible light communication mode, a first portion of the visible light emitting elements is driven and a second portion of the visible light emitting elements is idled for the first portion of the visible light emitting elements having a first current density. In a second visible light communication mode, each of the visible light emitting elements is driven so as to have a second current density. An illumination brightness difference of the light emitting device between the first visible light communication mode and the second visible light communication mode is smaller than 15%.

24 Claims, 15 Drawing Sheets

LIGHT EMITTING DEVICE AND DRIVING METHOD THEREOF

CROSS-REFERENCE TO RELATED APPLICATION

This application claims the priority benefit of Taiwan application serial no. 104138846, filed on Nov. 23, 2015. The entirety of the above-mentioned patent application is hereby incorporated by reference herein and made a part of this specification.

BACKGROUND OF THE DISCLOSURE

1. Field of the Disclosure

The disclosure relates to a light emitting device and a driving method thereof.

2. Description of Related Art

Application of solid-state light emitting elements such as light emitting diodes (LEDs) has become increasingly widespread, all such as the light source modules of display panels, the lighting devices used in everyday life, the indicating lights in public spaces are becoming more and more common to employ the light emitting diodes (LEDs) as a light source. In addition, along with the rapid development of communication technology, light emitting diodes are also employed in the application of wireless signal transmission, especially, the light emitting diodes used for illumination can be applied in technology of visible light communication (VLC).

The light emitting diodes of this sorts of solid-state light emitting elements have the advantages of low power consumption, fast response, long life, suitable for mass production, etc., so quite suitable for being applied to the light emitting devices for lighting. However, if these sorts of light emitting devices are to be applied in the visible light communication, many requirements are still required. For instance, in general, the dimensions of the light emitting diodes of the light emitting devices for lighting are comparatively larger. Taking a square light emitting diode as an example, the side length thereof may be several millimeters (mm). Therefore, the generated parasitic capacitance due to the dimension of the light emitting diode itself comparatively larger, and it may affect the signal transmission efficiency. In addition, if the operating current of the light emitting diode is increased in order to improve the signal modulation bandwidth, then it would apt to the shortened lifetime and poor stability of the components due to the heat accumulation. Therefore, it is not easy to use the light emitting devices for lighting as visible light communication media.

SUMMARY OF THE DISCLOSURE

The driving method of light emitting device of the disclosure may used for driving a light emitting device including a plurality of visible light emitting elements. In a first visible light communication mode, a first portion of the visible light emitting elements is driven and a second portion of the visible light emitting elements is idled, such that the first portion of the visible light emitting elements has a first current density. In a second visible light communication mode, each of the visible light emitting elements is driven so that each of the visible light emitting elements has a second current density, and the first current density is larger than the second current density. The illumination brightness difference of the light emitting device between the first visible light communication mode and the second visible light communication mode is smaller than 15%.

The light emitting device of the disclosure includes a plurality of first visible light emitting elements and a plurality of second visible light emitting elements. Each of the first visible light emitting elements has a first illumination area, and each of the second visible light emitting elements has a second illumination area. The first illumination area is smaller than the second illumination area, and the first visible light emitting elements and the second visible light emitting elements are arranged side by side. In the first visible light communication mode, the first visible light emitting elements are driven and the second visible light emitting elements are idled. In the second visible light communication mode, each of the first visible light emitting elements and the second visible light emitting elements is driven. The illumination brightness difference of the light emitting device between the first visible light communication mode and the second visible light communication mode is smaller than 15%.

The light emitting device of the disclosure includes a plurality of first visible light emitting elements and a plurality of second visible light emitting elements. Each of the first visible light emitting elements has a first current carrying capacity. Each of the second visible light emitting elements has a second current carrying capacity. The first current carrying capacity is larger than the second current carrying capacity, and the first visible light emitting elements and the second visible light emitting elements are arranged side by side. In the first visible light communication mode, the first visible light emitting elements are driven and the second visible light emitting elements are idled. In the second visible light communication mode, each of the first visible light emitting elements and the second visible light emitting elements is driven. The illumination brightness difference of the light emitting device between the first visible light communication mode and the second visible light communication mode is smaller than 15%.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
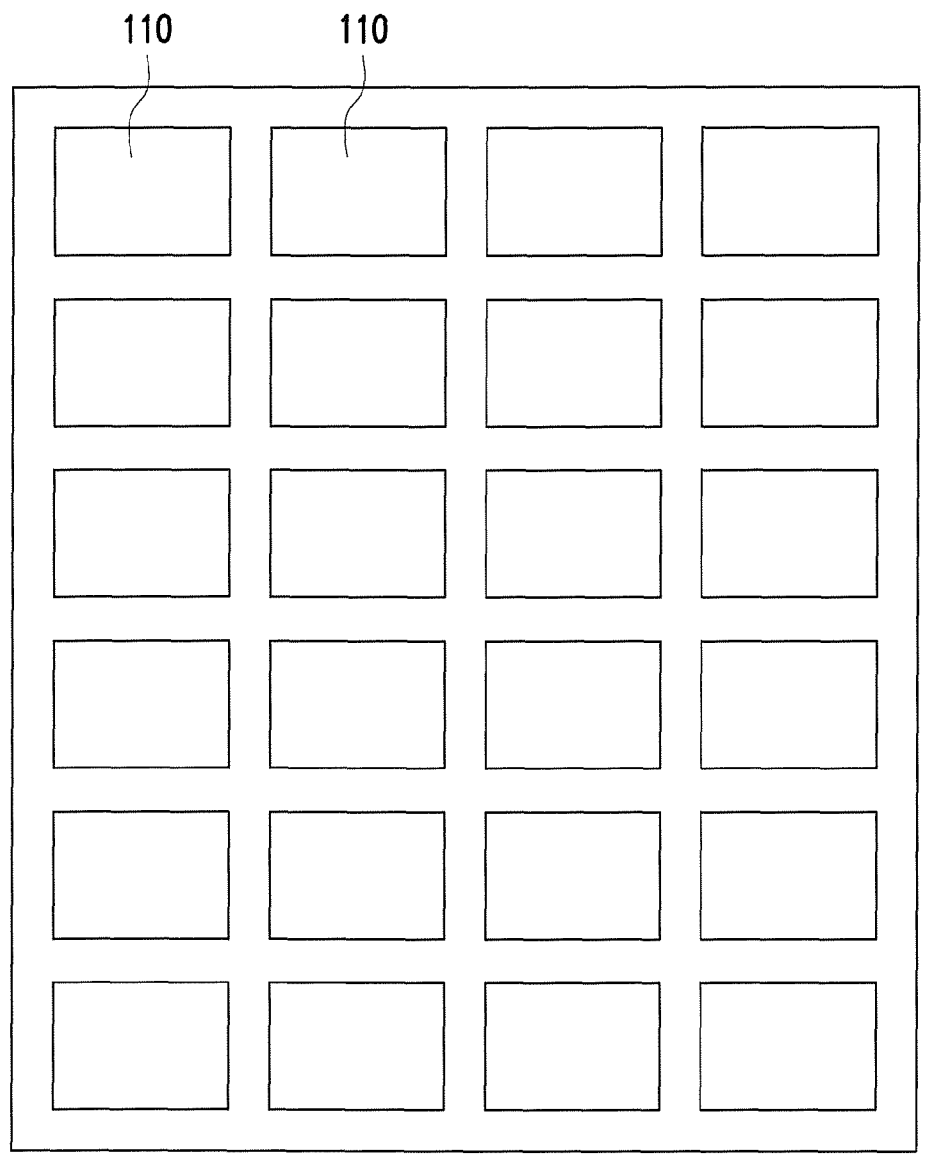
FIG. 1 is a schematic view of a light emitting device according to an exemplary embodiment of the disclosure.

FIG. 1 is a schematic view of a light emitting device according to an exemplary embodiment of the disclosure. As shown in FIG. 1, the light emitting device 100 includes a plurality of visible light emitting elements 110, and the visible light emitting elements are arranged side by side. In the embodiment, the visible light emitting elements 110 are arranged in an array of 6 rows and 4 columns, but in other embodiments the array may be composed of a different number of rows and columns. The so-called arranging side by side in the disclosure is not limited to that the components are arranged in two directions perpendicular to each other. In particular applications, the plurality of visible light emitting elements 110 may be arranged along tracks such as concentric circles, radial, Z shape, and so on. In other words, arranged side by side in the disclosure means that the visible light emitting elements 110 are arranged in a manner of not blocking each other's light emitting surface.

In the embodiment, each of the visible light emitting elements 110 is a visible light emitting diode adapted to emit a light with the visible light wavelength range, for example the wavelength is between 400 nm and 700 nm, however may also emit a light beyond the visible wavelength range, such as infrared light wavelength range. The visible light emitting elements 110 are semiconductors specifically, the material thereof includes Group III elements, Group V elements, and so on. The visible light emitting elements 110 may also be solid-state light emitting elements. In addition, in the disclosure, the dimensions or the illumination areas of the visible light emitting elements 110 may be different. The illumination area of each visible light emitting element 110 may be determined by the semiconductor material of LED dies, and it is not necessarily complete. In some embodiments, each of the visible light emitting elements 110 may be constituted by an LED die having a plurality of mesa structures, and the illumination areas of the visible light emitting elements 110 are determined by these mesas.

Figure 2A:
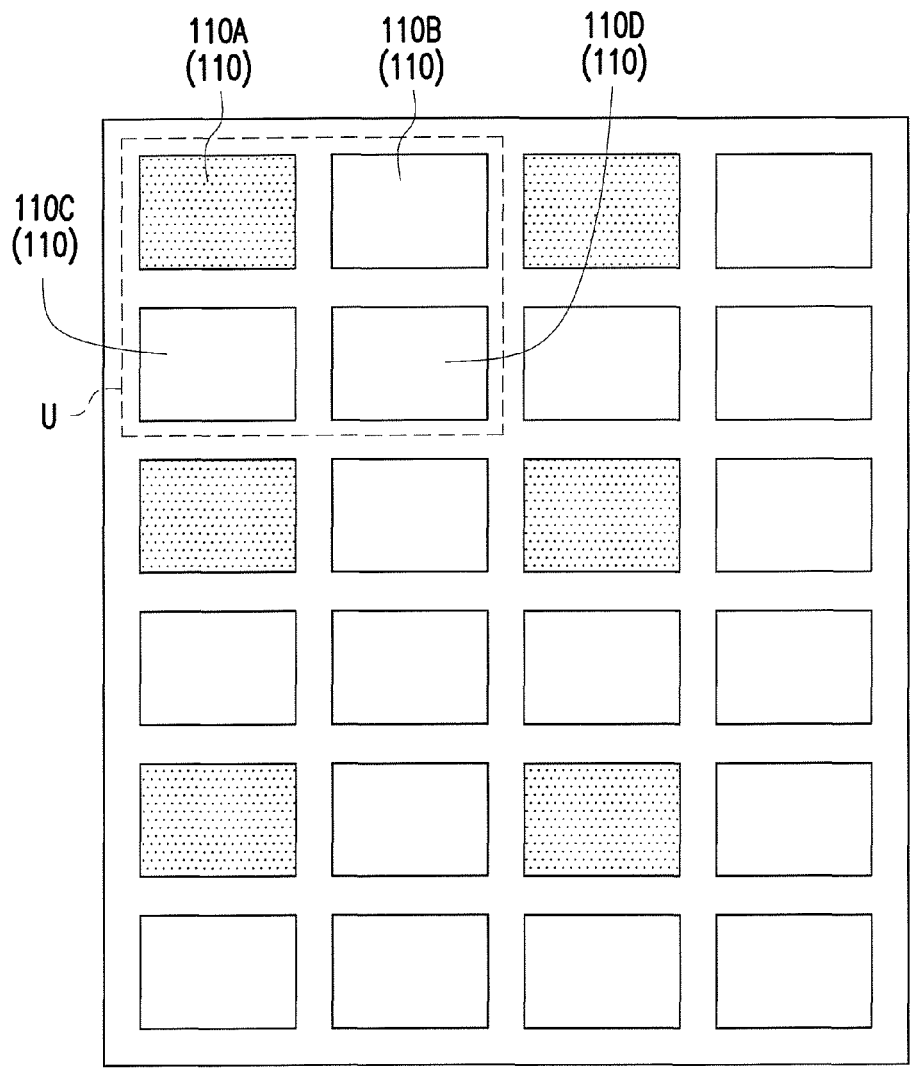
FIG. 2A is a schematic view of the light emitting device of FIG. 1 in the first visible light communication mode.

FIG. 2A is a schematic view of the light emitting device of FIG. 1 in the first visible light communication mode. Referring to FIG. 2A, the visible light emitting elements 110 of the light emitting device 100 may be divided into a plurality of groups U, wherein each group U includes four visible light emitting elements 110, and respectively numbered as visible light emitting elements 110A, visible light emitting elements 110B, visible light emitting elements 110C, and visible light emitting elements 110D. In the disclosure, the driven visible light emitting elements 110 are shown with thin-dot-filled patterns.

As shown in FIG. 2A, in the first visible light communication mode, merely a portion (called first portion) of the visible light emitting elements 110 are driven and another portion (called second portion) of the visible light emitting elements 110 are idled. Specifically, in each group U of FIG. 2A, in the first visible light communication mode, the visible light emitting elements 110A are driven and taken as the first portion of the visible light emitting elements 110. Similarly, in the first visible light communication mode, the visible light emitting elements 110B, 110C, 110D of each group U are idled and taken as the second portion of the visible light emitting elements 110. In this time, each of the first portion of the visible light emitting elements 110, i.e., each of the visible light emitting elements 110A of each group U, has a first current carrying capacity. In addition, in the first visible light communication mode, the light emitting device 100 emits light through the driven visible light emitting elements 110A.

The larger the current density of the light emitting device 100, the larger the signal transmission bandwidth in the application of light communication may be provided. In the embodiment, since the visible light emitting elements 110 driven in the first visible light communication mode has a larger first current density, the visible light emitting elements 110 driven in the first visible light communication mode may provide a larger bandwidth in transmission signal. Therefore, the light emitting device 100 not only may provide lighting function, but also may provide a signal transmission function with a high bandwidth, thereby serving as a device capable of both lighting and light communication. In addition, in the second visible light communication mode, although the current density of the visible light emitting elements 110 are comparatively lower, the light emitting device 100 may perform signal transmission for providing light communication function depending on the circumstances. Namely, no matter whichever the light communication mode is, the light emitting device 100 may provide a light communication function, and the light emitting device 100 has the first signal transmission bandwidth in the first visible light communication mode which is larger than the second signal transmission bandwidth in the second visible light communication mode.

Figure 2B:
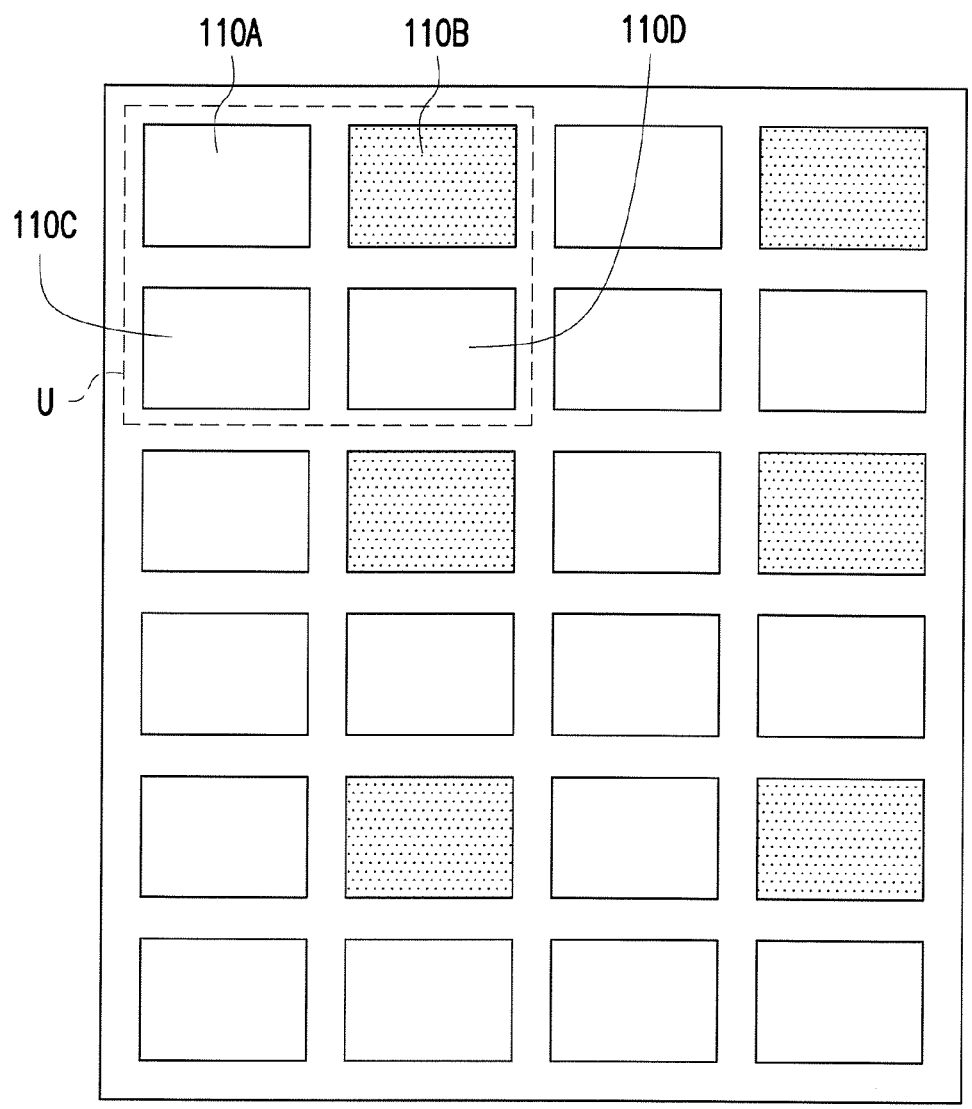
FIG. 2B through FIG. 2F are schematic views showing various embodiments of the light emitting device in the first visible light communication mode.
Figure 2C:
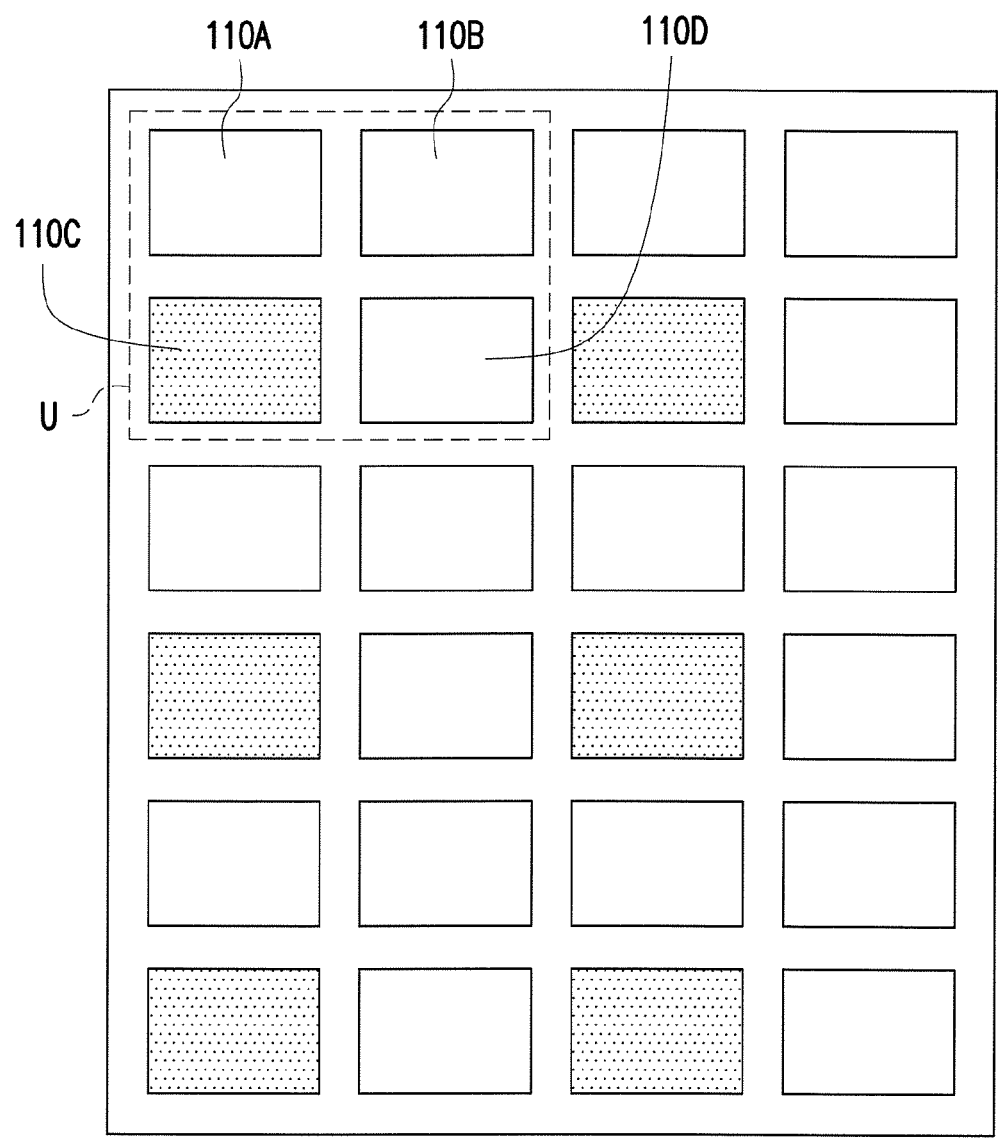
Figure 2D:
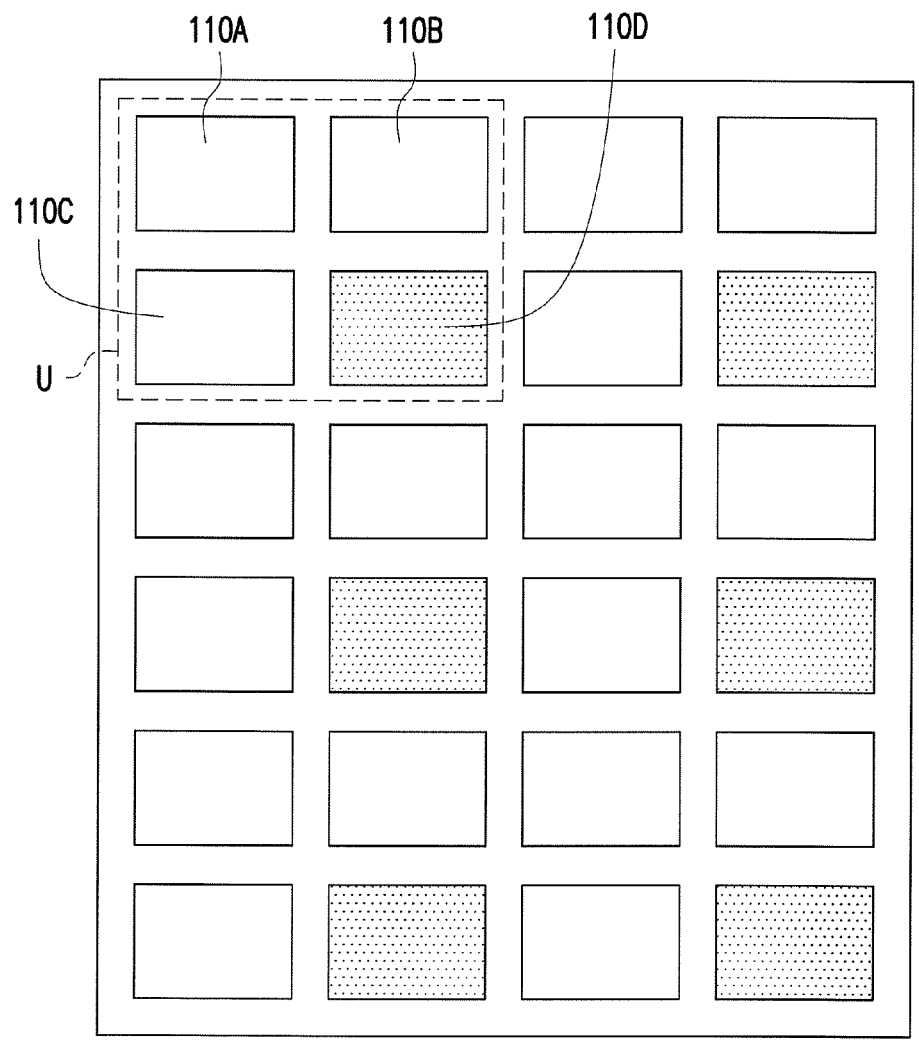

In the first visible light communication mode, the light emitting device 100 is not limited to emit light by driving the visible light emitting elements 110A as shown in FIG. 2A. For example, FIG. 2B through FIG. 2D are schematic views showing various embodiments of the light emitting device in the first visible light communication mode, and the reference number of each component shown in FIG. 2B through FIG. 2D is the same as that shown in FIG. 2A. In FIG. 2B, in the first visible light communication mode, the light emitting device 100 may drive the visible light emitting elements 110B of each group U, and such that the visible light emitting elements 110A, 110C, 110D of each group U are idled. In FIG. 2C, in the first visible light communication mode, the light emitting device 100 may drive the visible light emitting elements 110C of each group U, and such that the visible light emitting elements 110A, 110B, 110D of each group U are idled. In FIG. 2C, in the first visible light communication mode, the light emitting device 100 may drive the visible light emitting elements 110D of each group U, and such that the visible light emitting elements 110A, 110B, 110C of each group U are idled. Overall, in the light emitting device 100, as long as a portion of the visible light emitting elements 110 are driven and a portion of the visible light emitting elements 110 are idled, this mode is taken as the first visible light communication mode mentioned in the disclosure. For instance, in the first visible light communication mode, in FIG. 2A through FIG. 2D, for four visible light emitting elements 110 of each group U, there may be two of them being driven and another two of them being idled, or three of them being driven and another one of them being idled.

Figure 2E:
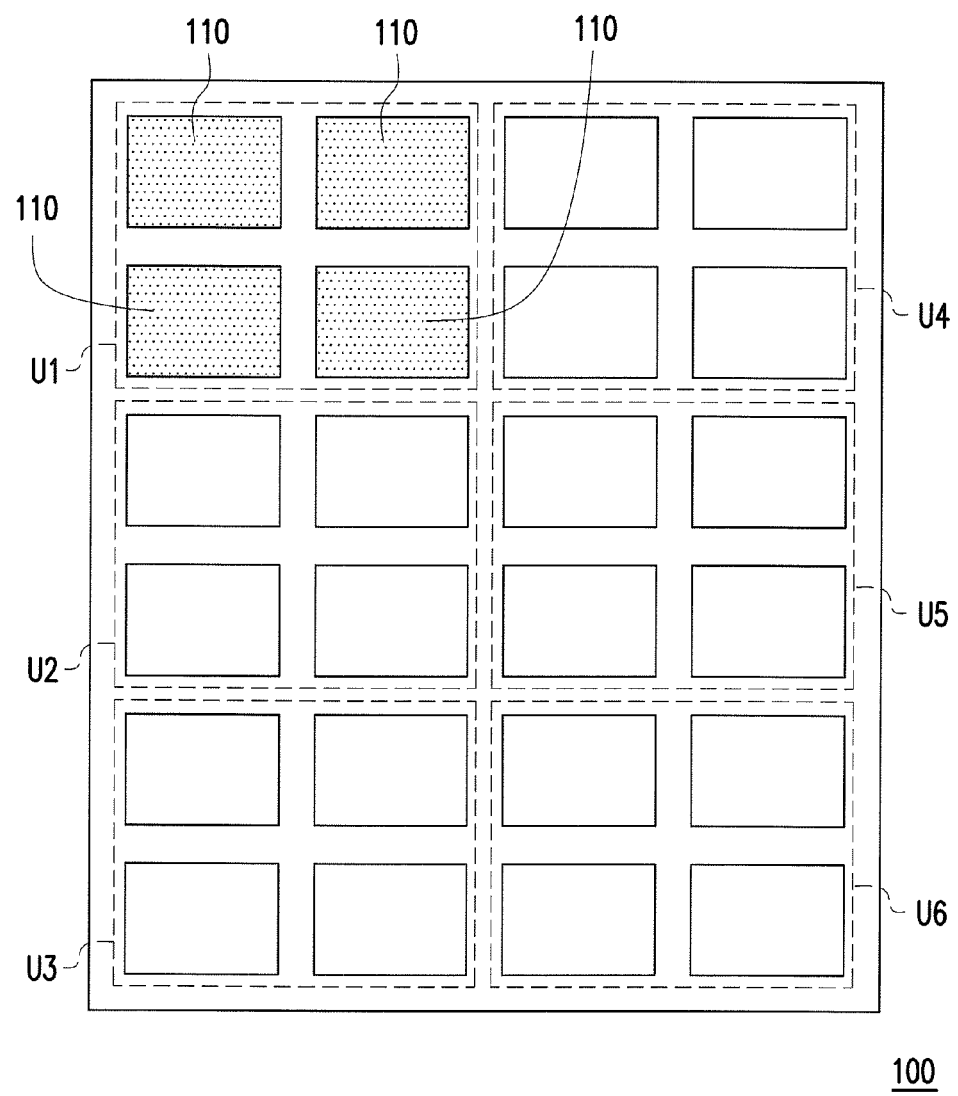
Figure 2F:
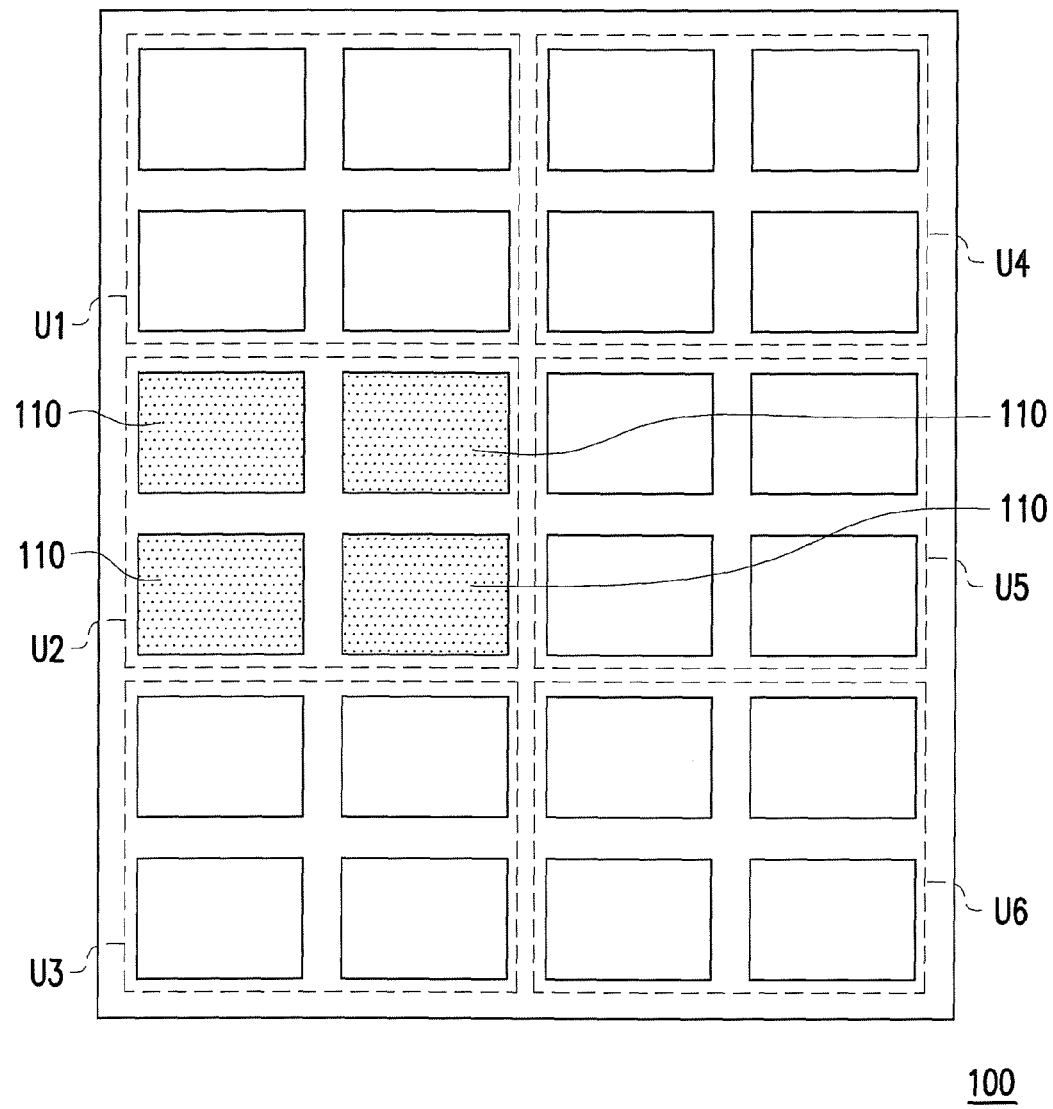

For instance, FIG. 2E to FIG. 2F are schematic views of the light emitting device of FIG. 1 in the first visible light communication mode. In FIG. 2E to FIG. 2F, the visible light emitting elements 110 of the light emitting device 100 are divided into a plurality of groups U1 to U6, and each of the groups U1 to U6 includes four visible light emitting elements 110. In the first visible light communication mode, the visible light emitting elements 110 of at least one group among the groups U1 to U6 are driven while the visible light emitting elements 110 of other groups are idled in the light emitting device 100. Taking FIG. 2E as an example, the first visible light communication mode is shown as the visible light emitting elements 110 of the group U1 are driven while the visible light emitting elements 110 of the groups U2 to U6 are idled. Taking FIG. 2F as an example, the first visible light communication mode is shown as the visible light emitting elements 110 of the group U2 are driven while the visible light emitting elements 110 of the groups U1 and U3 to U6 are idled. In other embodiments, the first visible light communication mode may be the visible light emitting elements 110 of the group U3 being driven while the visible light emitting elements 110 of the groups U1, U2 and U4 to U6 being idled, the visible light emitting elements 110 of the group U4 being driven while the visible light emitting elements 110 of the groups U1 to U3, U5, U6 being idled, the visible light emitting elements 110 of the group U5 being driven while the visible light emitting elements 110 of the groups U1 to U4 and U6 being idled, or the visible light emitting elements 110 of the group U6 being driven while the visible light emitting elements 110 of the groups U1 to U5 being idled. In other words, in the first visible light communication mode, the driven visible light emitting elements 110 may be concentratedly arranged as shown in FIG. 2E and FIG. 2F, and alternatively, the driven visible light emitting elements 110 may be separately disposed and not concentratedly arranged as shown in FIG. 2A through FIG. 2D. No matter whichever way the first visible light communication mode is performed, the visible light emitting elements 110 driven in this mode are taken as the first portion while the visible light emitting elements 110 idled are taken as the second portion.

Figure 3:
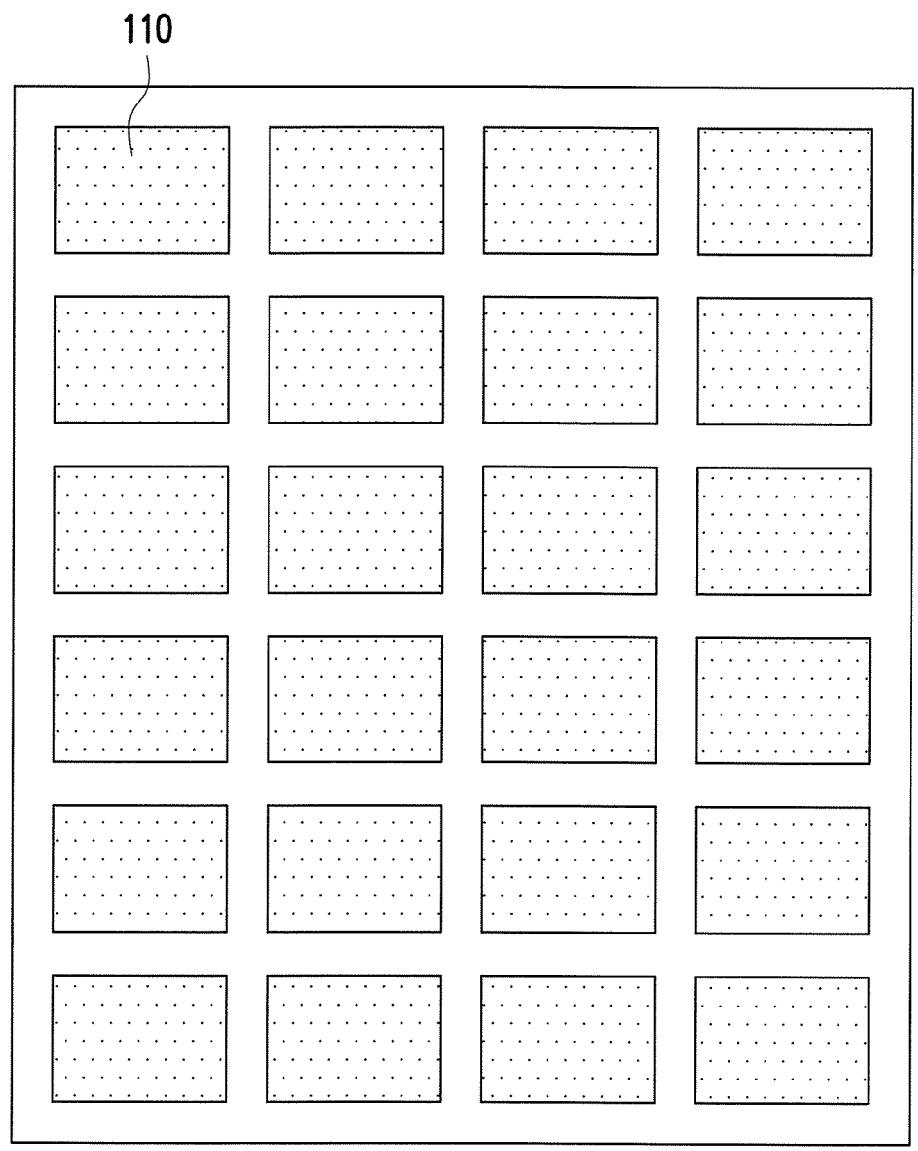
FIG. 3 is a schematic view of the light emitting device of FIG. 1 in the second visible light communication mode.

FIG. 3 is a schematic view of the light emitting device of FIG. 1 in the second visible light communication mode. Referring to FIG. 3, in the second visible light communication mode, each of the visible light emitting elements 110 is driven, such that each of the visible light emitting elements 110 has a second current density. In this time, the illumination brightness of the light emitting device 100 is emitted by all of the visible light emitting elements 110.

In the embodiment, no matter in the first visible light communication mode or in the second visible light communication mode, the same rated current may be input to the light emitting device 100. In this time, in the first visible light communication mode shown in any of FIG. 2A through FIG. 2F, only a portion of the visible light emitting elements 110 are driven while all of the visible light emitting elements 110 are driven in the second visible light communication mode shown in FIG. 3. Therefore, the first current density of each visible light emitting element 110 driven in the first visible light communication mode is larger than the second current density of each visible light emitting element 110 driven in the second visible light communication mode. For example, in the first visible light communication mode, the first current density of the driven visible light emitting elements 110 may be larger than 70 A/cm². In comparison, in the second visible light communication mode, the second current density of each of the driven visible light emitting elements 110 may be smaller than 70 A/cm².

The whole illumination area of the visible light emitting elements 110 driven in the first visible light communication mode is smaller than the whole illumination area of the visible light emitting elements 110 driven in the second visible light communication mode. Nevertheless, under different current densities, the illumination brightness of a single visible light emitting element 110 driven in the first visible light communication mode may be larger than the illumination brightness of a single visible light emitting element 110 driven in the second visible light communication mode. Therefore, for the overall light emitting device 100, when operated under two different light communication modes, the illumination brightness of the light emitting device 100 may substantially be the same.

For example, the illumination brightness difference of the light emitting device 100 between the first visible light communication mode and the second visible light communication mode is smaller than 15%. In other words, if the illumination brightness of the light emitting device 100 in the first visible light communication mode is X and the illumination brightness of the light emitting device 100 in the second visible light communication mode is Y, then the illumination brightness difference of the light emitting device 100 between the first visible light communication mode and the second visible light communication mode is V=(X−Y)/X, wherein |V|<15%, or |V|<10%, or even |V|<5%. In addition, the illumination wavelength difference of the light emitting device 100 between the first visible light communication mode and the second visible light communication mode is smaller than 2 nm, or even smaller than 1 nm. Therefore, even though alternately operated in these two visible light communication modes, the light emitting device 100 may still provide a stable illumination brightness, the users may not feel that the illumination brightness of the light emitting device 100 changes due to different driving modes. Accordingly, in the case that the light emitting device 100 is applied in the lighting field, it is unlikely to occur flickering problem.

In the embodiment, the visible light emitting elements 110 with current carry capacity sufficient to withstand the first current density may be driven in the first visible light communication mode and provides dual function of both lighting and visible light communication. If the visible light emitting elements 110A of each group U are the only ones having a larger current carrying capacity sufficient to withstand the first current density, then every time when the first visible light communication mode is performed, the performing way shown in FIG. 2A will be performed. However, in a case that all of the visible light emitting elements 110 of the light emitting device 100 have sufficient current carrying capacity, the light emitting device 100 may choose any one of the performing ways to perform the first visible light communication mode. In addition, in a case that the light emitting device 100 repeatedly performs the first visible light communication mode a plurality of times, then different portions of the visible light emitting elements 110 may be driven in the first visible light communication mode when performed at different times. For example, in the actual operation of the light emitting device 100, first any one of the performing ways shown in FIG. 2A through FIG. 2D may be performed in the first visible light communication mode, next another way of the performing ways shown in FIG. 2A through FIG. 2D may be performed in the first visible light communication mode. As such, in the first visible light communication mode which is performed at different times, different visible light emitting elements 110 may be driven, facilitating the light emitting device 100 to slow down the phenomenon of aging or damage due to long-term use. In other words, the alternately driving different visible light emitting elements 110 in the first visible light communication mode performed at different times may facilitate to extend the life-time of the light emitting device 100 and improve the reliability of the light emitting device 100.

Figure 4A:
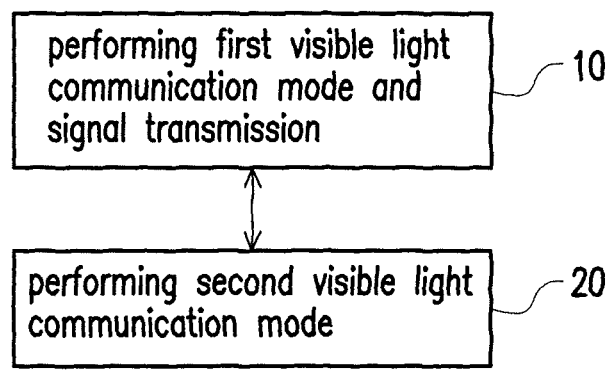
FIG. 4A is a schematic flowchart of a driving method of a light emitting device according to an exemplary embodiment of the disclosure.

FIG. 4A is a schematic flowchart of a driving method of a light emitting device according to an exemplary embodiment of the disclosure. Referring to FIG. 4A, the driving method of the embodiment may be used for driving the light emitting device 100 of FIG. 1 or any kind of light emitting device of the disclosure. The driving method of the disclosure includes alternately performing the step 10 and the step 20. The step 10 is the step which performs the first visible light communication mode and the signal transmission. In this time, any driving method of FIG. 2A through FIG. 2F or other similar driving methods may be used for driving the light emitting device 100. In the step 10, only a portion of the visible light emitting elements 110 are driven while the other portion of the light emitting elements 110 are idled. When the light emitting device 100 is operated by a rated current, the driven visible light emitting elements 110 have a larger current density, and a signal transmission with a higher bandwidth may be provided. The step 20 is the step which performs the second visible light communication mode. At this time, all of the visible light emitting elements 110 are performed, namely the method shown in FIG. 3 is used to operate the light emitting device 100. In the second visible light communication mode, since the driven visible light emitting elements 110 have a smaller current density, signal transmission may not be performed in the step 20. In other words, in one embodiment, along with the light emitting device 100 emitting light, it is possible to select to perform signal transmission only in the period when the first visible light communication mode is performed. In addition, when the step 10 is repeatedly performed, it is possible that different visible light emitting elements 110 of the light emitting device 100 are driven, optionally, so as to reduce the possibility of early damage of the visible light emitting elements 110.

Figure 4B:
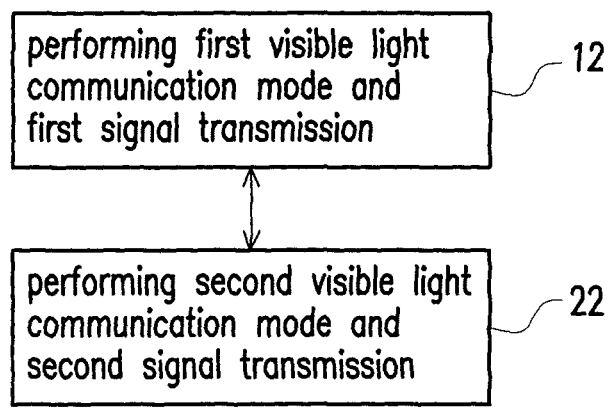
FIG. 4B is a schematic flowchart of a driving method of a light emitting device according to an exemplary embodiment of the disclosure.

FIG. 4B is a schematic flowchart of a driving method of a light emitting device according to an exemplary embodiment of the disclosure. Referring to FIG. 4B, the driving method of the embodiment may be used for driving the light emitting device 100 of FIG. 1, and including alternately performing the step 12 and the step 22. The step 12 is the step which performs the first visible light communication mode and the first signal transmission. In this time, any driving method of FIG. 2A through FIG. 2F or other similar driving methods may be used for driving the light emitting device 100. In the step 12, only a portion of the visible light emitting elements 110 are driven while the other visible light emitting elements 110 are idled, thus the driven visible light emitting elements 110 has a higher current density, and may provide the first signal transmission. In addition, the step 22 is the step which performs the second visible light communication mode and the second signal transmission, for example, the method shown in FIG. 3 is used for driving the light emitting device 100, that is all the of the visible light emitting elements 110 are driven. Under the operation of the rated current, the current density of the driven visible light emitting elements 110 is smaller compared to that of the first visible light communication mode. Therefore, the second signal transmission performed in the step 22 has a smaller bandwidth. In other words, in the embodiment, the light emitting device 100 may also perform signal transmission while emitting light, but the first signal transmission bandwidth of the first signal transmission performed in the first visible light communication mode is larger than the second signal transmission bandwidth of the second signal transmission performed in the second visible light communication mode. In one embodiment, the visible light emitting elements 110 which perform the second signal transmission in the second visible light communication mode may be the same as the visible light emitting elements 110 which perform the first signal transmission in the first visible light communication mode. Alternatively, in one embodiment, it is selectable that the visible light emitting elements 110 which perform the first signal transmission in the first visible light communication mode do not perform signal transmission in the second visible light communication mode, but only provides lighting function. In addition, when the step 12 is repeatedly performed, it is possible that different visible light emitting elements 110 of the light emitting device 100 are driven, optionally, so as to reduce the possibility of early damage of the visible light emitting elements 110.

Figure 5:
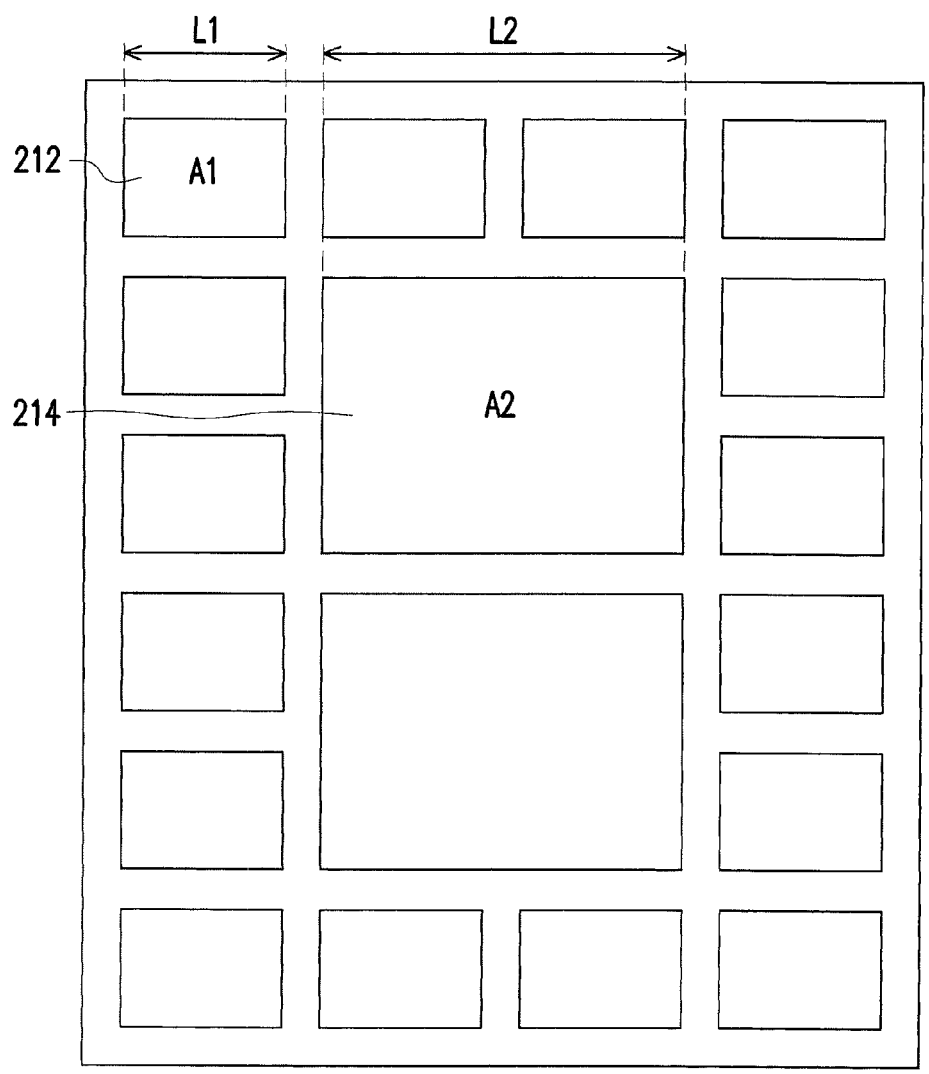
FIG. 5 is a schematic view of a light emitting device according to another exemplary embodiment of the disclosure.

FIG. 5 is a schematic view of a light emitting device according to another exemplary embodiment of the disclosure. Referring to FIG. 5, the light emitting device 200 includes a plurality of first visible light emitting elements 212 and a plurality of second visible light emitting elements 214, and the first visible light emitting elements 212 and the second visible light emitting elements 214 are arranged side by side. Each of the first visible light emitting elements 212 has a first light emitting layer, each of the second visible light emitting elements 214 has a second light emitting layer, and a material of the first light emitting layer is different from a material of the second light emitting layer. For example, the illumination wavelength of the first light emitting layer of the first visible light emitting elements 212 is in an infrared light wavelength range. In the embodiment, each of the first visible light emitting elements 212 has a first illumination area A1, each of the second visible light emitting elements 214 has a second illumination area A2, and the first illumination area A1 is smaller than the second illumination area A2. Specifically, the first illumination area A1 is a polygonal area, and the side length L1 of the first illumination area A1 is, for example, larger than or equal to 5 μm and smaller than 1 mm. The second illumination area A2 may also be a polygonal area, and the side length L2 of the second illumination area A2 may be several times of the side length L1. The light emitting device 200 may use the driving method similar to the driving method of the light emitting device 100 for driving, so as to provide a lighting function and a signal transmission function. In other words, the light emitting device 200 uses any method shown in FIG. 4A and FIG. 4B for driving.

Figure 6A:
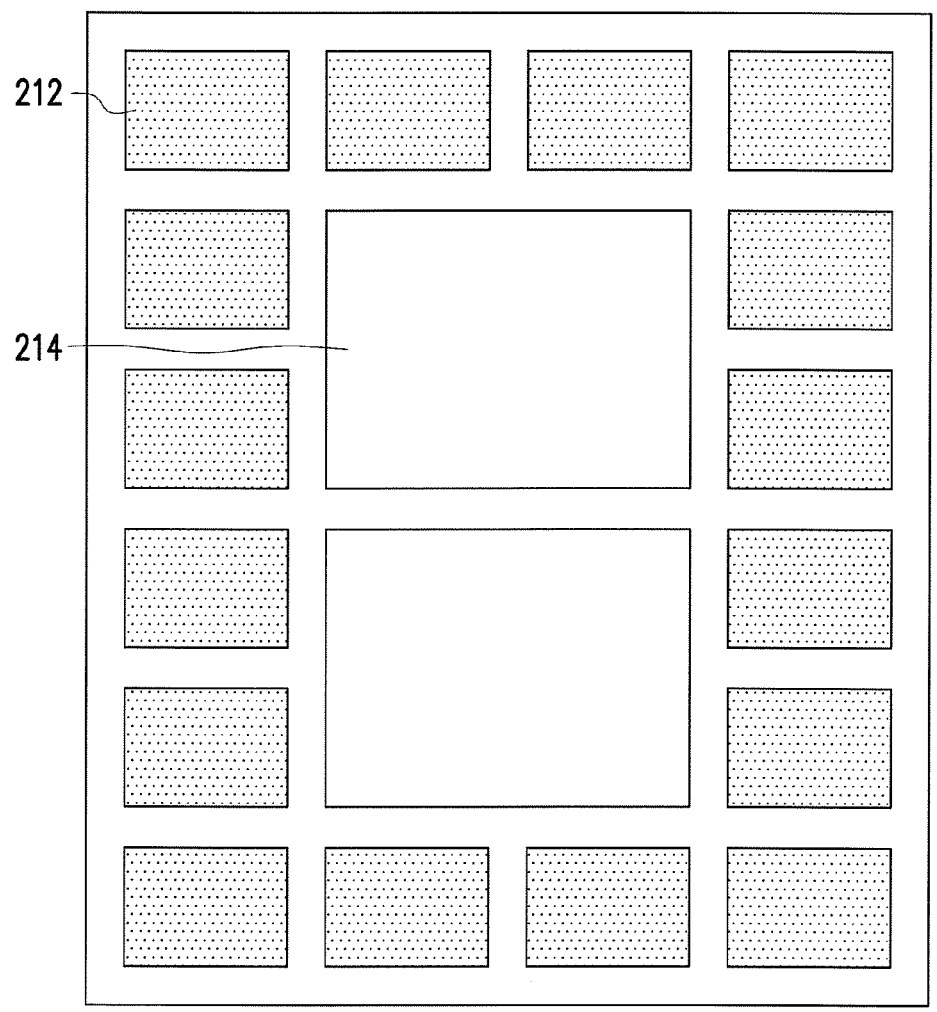
FIG. 6A is a schematic view of the light emitting device of FIG. 5 in the first visible light communication mode.
Figure 6B:
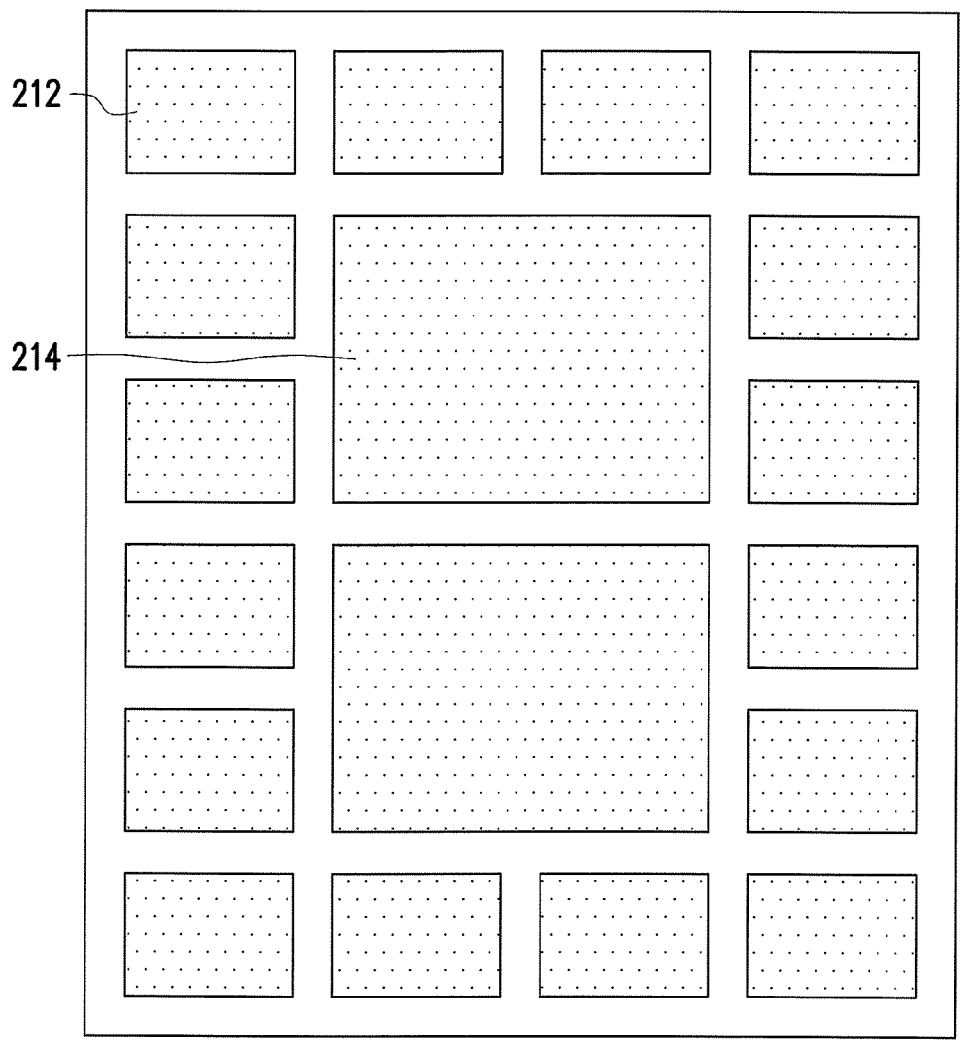
FIG. 6B is a schematic view of the light emitting device of FIG. 5 in the second visible light communication mode.

Specifically, the light emitting device 200 may use two modes for driving, for example, the first visible light communication mode and the second visible light communication mode. FIG. 6A is a schematic view of the light emitting device of FIG. 5 in the first visible light communication mode, and FIG. 6B is a schematic view of the light emitting device of FIG. 5 in the second visible light communication mode. As shown in FIG. 6A, in the first visible light communication mode, only the first visible light emitting elements 212 are driven, while the second visible light emitting elements 214 are idled in the light emitting device 200. As shown in FIG. 6B, in the second visible light communication mode, each of the first visible light emitting elements 212 and the second visible light emitting elements 214 is driven.

In the first visible light communication mode, each visible light emitting element 212 has a first current density, and in the second visible light communication mode, each of the first visible light emitting elements 212 and the second visible light emitting element 214 has a second current density. In addition, the first current density is larger than the second current density. Therefore, the illumination brightness of a single first visible light emitting element 212 driven in the first visible light communication mode may be larger than the illumination brightness of a single first visible light emitting element 212 driven in the second visible light communication mode. Nevertheless, the whole illumination area of the first visible light emitting elements 212 and the second visible light emitting elements 214 driven in the second visible light communication mode is larger than the whole illumination area of the first visible light emitting elements 212 driven in the first visible light communication mode. Therefore, the illumination brightness difference of the light emitting device 200 between the first visible light communication mode and the second visible light communication mode is smaller than a degree that the users may feel. In other words, in either of the visible light communication modes, the light emitting device 200 may provide a substantially equal rated output power.

In the embodiment, the description that the illumination brightness difference of the light emitting device 200 between the first visible light communication mode and the second visible light communication mode is smaller than a degree that the users may feel means that, the illumination brightness difference of the light emitting device 200 between the first visible light communication mode and the second visible light communication mode is smaller than 15%. In other words, if the illumination brightness of the light emitting device 200 in the first visible light communication mode is X and the illumination brightness of the light emitting device 200 in the second visible light communication mode is Y, then the illumination brightness difference of the light emitting device 200 between the first visible light communication mode and the second visible light communication mode is V=(X−Y)/X, wherein |V|<15%, or |V|<10%, or even |V|<5%. In addition, the illumination wavelength difference of the light emitting device 200 between the first visible light communication mode and the second visible light communication mode is smaller than 2 nm, or even smaller than 1 nm.

In addition, in the first visible light communication mode, since the first density current of the first visible light emitting elements 212 is larger, the light emitting device 200 may provide a higher signal transmission bandwidth when performing signal transmission. In the second visible light communication mode, the signal transmission bandwidth provided by the light emitting device 200 may be comparatively lower. Therefore, when using the driving method of FIG. 4A to drive the light emitting device 200, the light emitting device 200 may provide signal transmission function with a high bandwidth only in the first visible light communication mode. When using the driving method of FIG. 4B to drive the light emitting device 200, the light emitting device 200 may alternately provide signal transmission function with a high bandwidth and signal transmission function with a low bandwidth during performing the lighting function. As such, the light emitting device 200 may be operated according to different requirements.

Figure 6C:
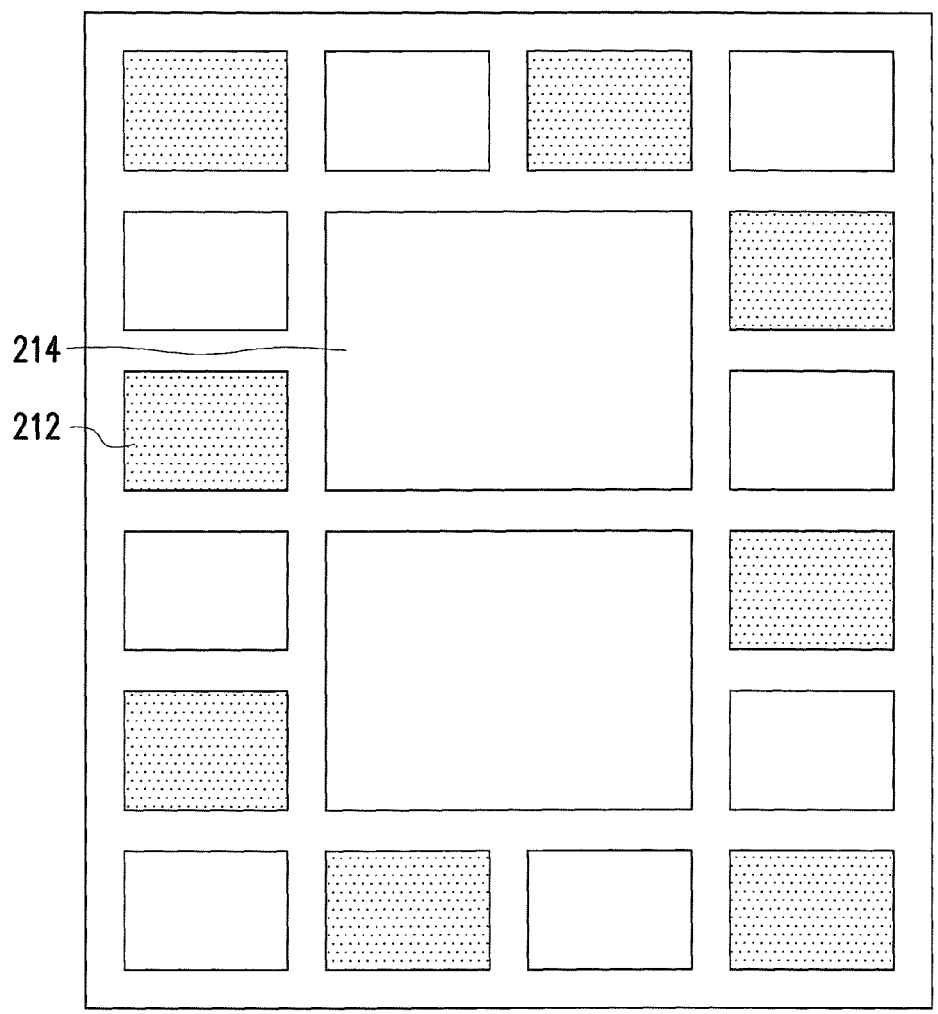
FIG. 6C is a schematic view showing another embodiment of the light emitting device of FIG. 5 in the first visible light communication mode.

FIG. 6C is a schematic view showing another embodiment of the light emitting device of FIG. 5 in the first visible light communication mode. In FIG. 6C, the light emitting device 200 may drive only a portion of the first visible light emitting elements 212, and other portion of the first visible light emitting elements 212 and all of the second visible light emitting elements 214 are idled, in the first visible light communication mode. Additionally, when the first visible light communication mode is performed at different times, different first visible light emitting elements 212 may be driven. In other words, the first visible light emitting elements 212 may be driven in turn in the first visible light communication mode at different times. As such, the life time of the first visible light emitting elements 212 may be unlikely to decrease due to excessively frequent operating in high current density, for example, early damage is unlikely to occur.

Figure 7:
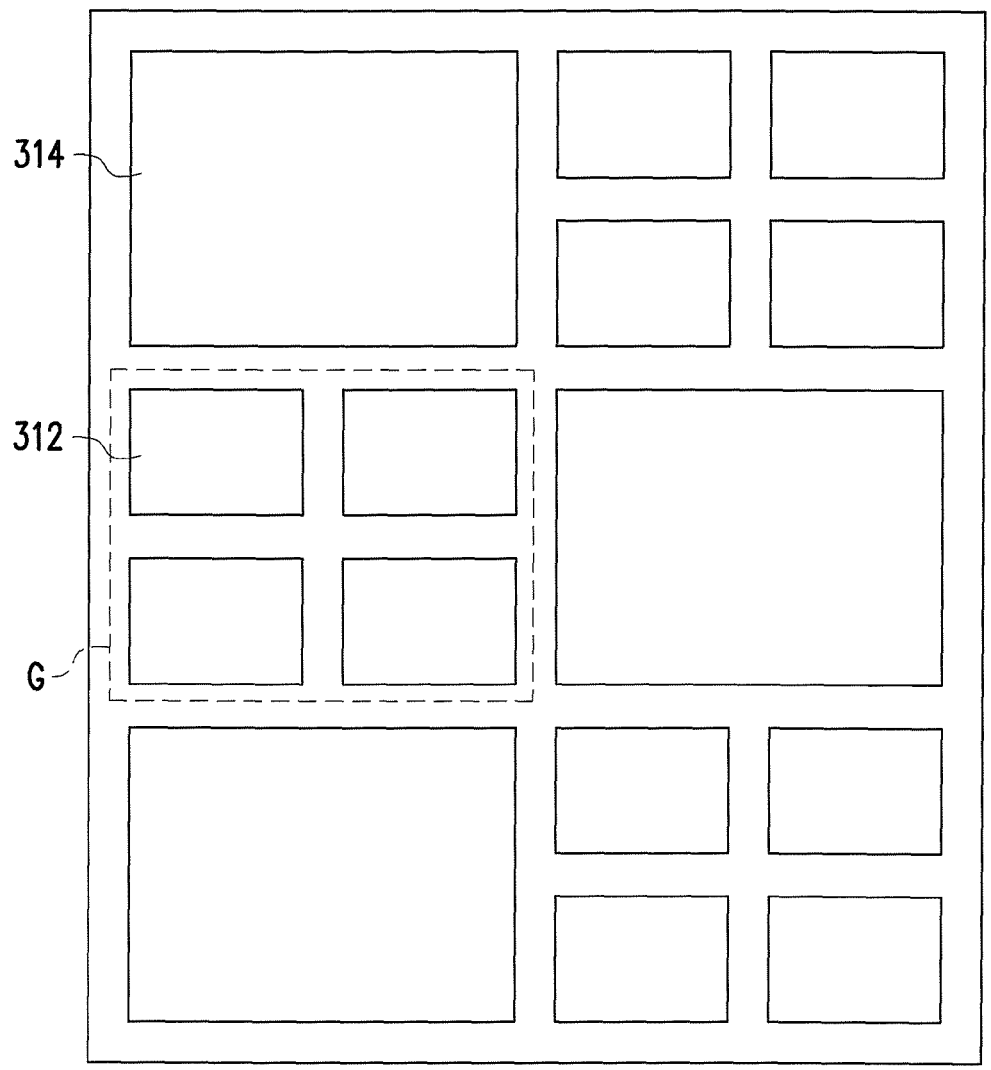
FIG. 7 is a schematic view of a light emitting device according to another exemplary embodiment of the disclosure.

In the embodiment of FIG. 5, the arranging way of the first visible light emitting elements 212 and the second visible light emitting elements 214 is that, the second visible light emitting elements 214 are located at the center, and the first visible light emitting elements 212 surround the second visible light emitting elements 214. However, the arranging way of the components of the disclosure is not limited. For example, FIG. 7 is a schematic view of a light emitting device according to another exemplary embodiment of the disclosure. In FIG. 7, the light emitting device 300 includes a plurality of first visible light emitting elements 312 and a plurality of second visible light emitting elements 314, wherein every four of the first visible light emitting elements 312 are arranged in 2×2 to form a group G, and the second visible light emitting elements 314 and the groups G are arranged alternately. The light emitting device 300 uses any method shown in FIG. 4A and FIG. 4B for driving. Specifically, in the first visible light communication mode, only a portion of the first visible light emitting elements 312 may be driven, and in the second visible light communication mode, all of the first visible light emitting elements 312 and all of the second visible light emitting elements 314 may be driven.

In the embodiments of FIG. 5 and FIG. 7, the first current carrying capacity of the first visible light emitting elements 212 and 312 may be larger than the second current carrying capacity of the second visible light emitting elements 214 and 314. Therefore, the first visible light emitting elements 212 and 312 may be driven in the first visible light communication mode, and may not lead to damage due to the excessively high current density.

In the abovementioned embodiment, any one of the light emitting devices 100 through 300 may provide white light and is applicable in lighting field. At this time, a single visible light emitting element may include at least one light emitting diode chip and phosphor matched with the illumination wavelength of the light emitting diode chip. For example, the blue light emitting diode chip matched with yellow phosphor, or yellow-green phosphor. Alternatively, the blue light emitting diode and the red light emitting diode matched with yellow phosphor, or yellow-green phosphor. In addition, a single visible light emitting element may be composed of a plurality of light emitting diode chips optionally without phosphor. If the visible light emitting element includes a plurality of light emitting diode chips, the light emitting diode chips have different illumination wavelength ranges, thereby facilitating providing more kinds of signal transmission.

Figure 8:
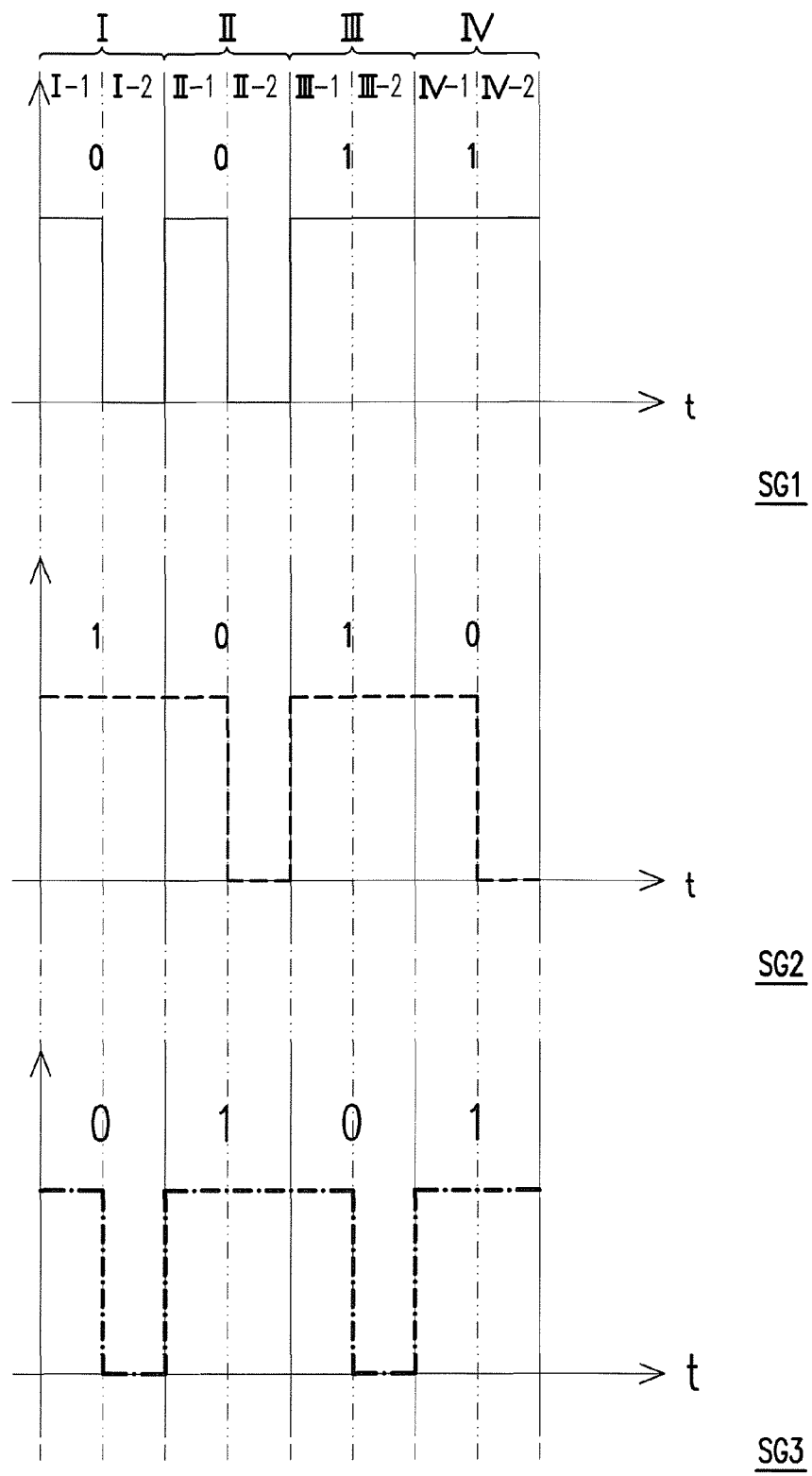
FIG. 8 is a schematic view of the transmission signals of a light emitting device according to an exemplary embodiment of the disclosure.

FIG. 8 is a schematic view of the transmission signals of a light emitting device according to an exemplary embodiment of the disclosure. Referring to FIG. 8, each of the visible light emitting elements of the light emitting device includes three light emitting diode chips, and the three light emitting diode chips may be driven respectively. When the three light emitting diode chips emit different wavelength ranges respectively, the light of different light emitting diode chips may be distinguished due to the different wavelength ranges. In addition, when the illumination brightness or the switching frequencies during transmission of different light emitting diode chips are different, the light of different light emitting diode chips may also be distinguished. Therefore, the different light emitting diode chips may respectively provide corresponding channels for transmitting the first signal SG1, the second signal SG2 and the third signal SG3.

In the four time sequences I, II, III and IV shown in FIG. 8, each of the time sequences I, II, III and IV may be divided into two time periods and each of the time sequences I, II, III and IV is not more than one sixtieth of a second, wherein one is for providing lighting function while the other one is for providing signal transmission function. In one embodiment, in the time period I-1, II-1, III-1 or IV-1, the visible light emitting element may provide lighting function, while in the time period I-2, II-2, III-2 or IV-2, the visible emitting element may provide signal transmission function. However, in other embodiments, the time period for providing signal transmission function may be earlier than the time period for providing lighting function. In addition, the first signal SG1, the second signal SG2 and the third signal SG3 are independent to each other, thus at least in the time period for providing signal transmission function, the first signal SG1, the second signal SG2 and the third signal SG3 may be synchronized with each other, not synchronized with each other, or partially synchronized with each other.

For instance, the first signal SG1 has low level, low level, high level and high level in the time periods I-2, II-2, III-2 and IV-2, respectively. The second signal SG2 has high level, low level, high level and low level in the time periods I-2, II-2, III-2 and IV-2, respectively. The third signal SG3 has low level, high level, low level and high level in the time periods I-2, II-2, III-2 and IV-2, respectively. As such, if the low-level bit information for transmitting is 0 and the high-level bit information for transmitting is 1, then the first signal SG1 in the time sequences I to IV respectively transmits bit information of 0, 0, 1, 1, the second signal SG2 in the time sequences I to IV respectively transmits bit information of 1, 0, 1, 0, and the third signal SG3 in the time sequences I to IV respectively transmits bit information of 0, 1, 0, 1. In other embodiments, signals of different frequencies may be used and respectively transmits different bit information, and no need to distinguish the kind of the bit information desired to be transmitted by high level or low level. As such, the light emitting device may provide more channels to perform signal transmission, and signal transmission operation of different channels may be independently performed without affecting each other, thereby facilitating to realize multifunction technology.

In light of the foregoing, the driving method of the light emitting device of the embodiment of the disclosure includes the first visible light communication mode and the second visible light communication mode. The first visible light communication mode merely drives a portion of the visible light emitting elements and the driven visible light emitting elements have a larger current density. The second visible light communication mode merely drives all of the visible light emitting elements and the driven visible light emitting elements have a smaller current density. As such, in the first visible light communication mode, the light emitting device may provide signal transmission function with a higher bandwidth while providing lighting function at the same time. In the second visible light communication mode, the light emitting device may also provide signal transmission function with a lower bandwidth while providing lighting function at the same time. Therefore, the light emitting device of the disclosure has dual function which may take care of both lighting function and light communication function. Moreover, when the first visible light communication mode is performed at different times, different visible light emitting elements of the light emitting device of the disclosure may be driven in turn, facilitating to slow down the phenomenon of aging or damage of the visible light emitting elements due to driven in high current density. Therefore, the light emitting device of the disclosure has an ideal service life and reliability. Furthermore, the visible light emitting elements of the light emitting device may include a plurality of light emitting chips, and the light emitting chips may be operated independently and provide a plurality of transmission channels so as to achieve multi-function technology.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A driving method of a light emitting device, the light emitting device comprising a plurality of visible light emitting elements, the visible light emitting elements comprising light emitting diode chips, the driving method of the light emitting device comprising:

in a first visible light communication mode, lighting the light emitting device to provide a first illumination brightness by providing a first current density to drive each of a first portion of the visible light emitting elements and idling a second portion of the visible light emitting elements; and in a second visible light communication mode, lighting the light emitting device to provide a second illumination brightness by providing a second current density to drive each of the visible light emitting elements, the first current density being larger than the second current density, wherein an illumination brightness difference of the first illumination brightness and the second illumination brightness is smaller than 15%, and a first signal transmission bandwidth of the each of the first portion of the light emitting elements in the first visible light communication mode is larger than a second signal transmission bandwidth of the each of the light emitting elements in the second visible light communication mode.

2. The driving method of the light emitting device as claimed in claim 1, wherein the first visible light communication mode is performed a plurality of times, and different portions of the visible light emitting elements are driven in the first visible light communication mode which is performed at different times.

3. The driving method of the light emitting device as claimed in claim 1, wherein the first portion of the visible light emitting elements performs a first signal transmission in the first visible light communication mode.

4. The driving method of the light emitting device as claimed in claim 3, wherein the each of the visible light emitting elements performs a second signal transmission in the second visible light communication mode.

5. The driving method of the light emitting device as claimed in claim 3, wherein the first portion of the visible light emitting elements performs a second signal transmission in the second visible light communication mode.

6. The driving method of the light emitting device as claimed in claim 1, wherein the first portion of the visible light emitting elements driven in the first visible light communication mode has a current carrying capacity sufficient to withstand the first current density.

7. The driving method of the light emitting device as claimed in claim 1, wherein the first current density is larger than 70 A/cm$^2$.

8. The driving method of the light emitting device as claimed in claim 1, wherein the second current density is between 10 A/cm$^2$ and 70 A/cm$^2$.

9. The driving method of the light emitting device as claimed in claim 1, wherein a rated current is input to the light emitting device in both of the first visible light communication mode and the second visible light communication mode.

10. The driving method of the light emitting device as claimed in claim 1, wherein an illumination wavelength difference of the light emitting device between the first visible light communication mode and the second visible light communication mode is smaller than 2 nm.

11. The driving method of the light emitting device as claimed in claim 1, wherein the light emitting diode chips has different illumination wavelength ranges, and the light emitting diode chips which are driven transmit different signals.

12. A light emitting device, comprising:
a plurality of first visible light emitting elements, comprising first light emitting diode chips each having a first illumination area; and
a plurality of second visible light emitting elements, comprising second light emitting diode chips each having a second illumination area, the first illumination area being smaller than the second illumination area and the first visible light emitting elements and the second visible light emitting elements being arranged side by side, wherein
in a first visible light communication mode, each of the first visible light emitting elements is driven by a first current density and the second visible light emitting elements are idled,
in a second visible light communication mode, each of the first visible light emitting elements and the second visible light emitting elements is driven by a second current density, the first current density is greater than the second current density,
an illumination brightness difference of the light emitting device between the first visible light communication mode and the second visible light communication mode is smaller than 15%, and
a first signal transmission bandwidth of each of the first visible light emitting elements in the first visible light communication mode is larger than a second signal transmission bandwidth of each of the first visible light emitting elements and the second visible light emitting elements in the second visible light communication mode.

13. The light emitting device as claimed in claim 12, wherein each of the first visible light emitting elements has a first current carrying capacity, each of the second visible light emitting elements has a second current carrying capacity, and the first current carrying capacity is larger than the second current carrying capacity.

14. The light emitting device as claimed in claim 12, wherein the first illumination area is a polygonal area, and each side length of the polygonal area is larger than or equal to 5 μm and smaller than 1 mm.

15. The light emitting device as claimed in claim 12, wherein each of the first visible light emitting elements has a first light emitting layer, each of the second visible light emitting elements has a second light emitting layer, and a material of the first light emitting layer is different from a material of the second light emitting layer.

16. The light emitting device as claimed in claim 15, wherein an illumination wavelength of the first light emitting layer is in an infrared light wavelength range.

17. The light emitting device as claimed in claim 12, wherein an illumination wavelength difference of the light emitting device between the first visible light communication mode and the second visible light communication mode is smaller than 2 nm.

18. The light emitting device as claimed in claim 12, wherein the first and second light emitting diode chips have different illumination wavelength ranges, and the first and second light emitting diode chips which are driven transmit different signals.

19. A light emitting device, comprising:
a plurality of first visible light emitting elements, comprising first light emitting diode chips each having a first current carrying capacity; and
a plurality of second visible light emitting elements, comprising second light emitting diode chips each having a second current carrying capacity, the first current carrying capacity being larger than the second current carrying capacity, and the first visible light emitting elements and the second visible light emitting elements being arranged side by side, wherein
in a first visible light communication mode, each of the first visible light emitting elements is driven by a first current density and the second visible light emitting elements are idled,
in a second visible light communication mode, each of the first visible light emitting elements and the second visible light emitting elements is driven by a second current density, the first current density is greater than the second current density,
an illumination brightness difference of the light emitting device between the first visible light communication mode and the second visible light communication mode is smaller than 15%, and
a first signal transmission bandwidth of each of the first visible light emitting elements in the first visible light communication mode is larger than a second signal transmission bandwidth of each of the first visible light emitting elements and the second visible light emitting elements in the second visible light communication mode.

20. The light emitting device as claimed in claim 19, wherein an illumination area of each of the first visible light emitting elements is equal to an illumination area of each of the second visible light emitting elements.

21. The light emitting device as claimed in claim 19, wherein each of the first visible light emitting elements has a first light emitting layer, each of the second visible light emitting elements has a second light emitting layer, and a material of the first light emitting layer is different from a material of the second light emitting layer.

22. The light emitting device as claimed in claim 19, wherein an illumination wavelength of the first light emitting layer is in an infrared light wavelength range.

23. The light emitting device as claimed in claim 19, wherein an illumination wavelength difference of the light emitting device between the first visible light communication mode and the second visible light communication mode is smaller than 2 nm.

24. The light emitting device as claimed in claim 19, wherein the first and second light emitting diode chips have different illumination wavelength ranges, and the first and second light emitting diode chips which are driven transmit different signals.

* * * * *